US006661137B2

(12) United States Patent
Gauthier

(10) Patent No.: US 6,661,137 B2
(45) Date of Patent: Dec. 9, 2003

(54) DRIVE ELEMENT SUCH AS A DRIVING WHEEL OR A HOISTING WINCH, THE ELEMENT COMPRISING A SYNCHRONOUS MOTOR

(75) Inventor: Pascal Gauthier, Asnieres-sur-Nouere (FR)

(73) Assignee: Moteurs Leroy-Somer, Angouleme (FR)

(*) Notice: Subject to any disclaimer, the term of this patent is extended or adjusted under 35 U.S.C. 154(b) by 0 days.

(21) Appl. No.: 10/075,450

(22) Filed: Feb. 15, 2002

(65) Prior Publication Data

US 2002/0121823 A1 Sep. 5, 2002

(30) Foreign Application Priority Data

Feb. 20, 2001 (FR) .............................. 01 02263
Apr. 20, 2001 (FR) .............................. 01 05412

(51) Int. Cl.$^7$ ................................ H02K 7/10
(52) U.S. Cl. ............ 310/75 R; 310/75 D; 310/156.01
(58) Field of Search ................. 310/75 R, 67 R, 310/75 D, 156.01, 156.48–156.54; 180/65.1–65.8

(56) References Cited

U.S. PATENT DOCUMENTS

| 871,758 A | 11/1907 | Heitmann et al. |
|---|---|---|
| 1,045,159 A | 11/1912 | Lundell |
| 2,386,673 A | 10/1945 | Fisher |
| 3,889,140 A | 6/1975 | Baermann |
| 4,302,693 A | 11/1981 | Burgmeier et al. |
| 4,339,874 A | 7/1982 | McCarty et al. |
| 4,617,725 A | 10/1986 | Holter et al. |
| 5,047,681 A | 9/1991 | Gaillard et al. |
| 5,091,668 A | 2/1992 | Cuenot et al. |
| 5,162,686 A | 11/1992 | Royer |
| 5,633,544 A | 5/1997 | Toida et al. |
| 5,642,013 A | 6/1997 | Wavre |
| 5,691,584 A * | 11/1997 | Toida et al. ............... 310/67 R |
| 5,693,995 A | 12/1997 | Syverson |
| 5,729,072 A | 3/1998 | Hirano et al. |
| 5,744,888 A | 4/1998 | Zajc et al. |
| 5,747,909 A | 5/1998 | Syverson et al. |
| 5,760,503 A | 6/1998 | Tsuchida et al. |
| 5,828,147 A | 10/1998 | Best et al. |
| 5,838,086 A | 11/1998 | Cuenot et al. |
| 5,841,212 A | 11/1998 | Mita et al. |
| 5,851,162 A | 12/1998 | Tether |
| 5,864,192 A | 1/1999 | Nagate et al. |
| 6,013,962 A | 1/2000 | Nashiki |
| 6,025,665 A | 2/2000 | Poag et al. |
| 6,031,311 A | 2/2000 | Lee |
| 6,144,132 A | 11/2000 | Nashiki |
| 6,276,481 B1 * | 8/2001 | Matsuto et al. ............. 180/220 |
| 6,369,473 B1 | 4/2002 | Baumeister et al. |
| 6,441,525 B1 | 8/2002 | Koharagi et al. |
| 6,525,442 B2 | 2/2003 | Koharagi et al. |
| 6,531,797 B2 | 3/2003 | Eydelie et al. |

FOREIGN PATENT DOCUMENTS

| DE | 38 26 933 A1 | 2/1990 |
|---|---|---|
| DE | 42 18 888 A1 | 12/1993 |
| DE | 195 03 610 A1 | 8/1996 |
| DE | 197 32 637 A1 | 2/1999 |
| DE | 199 03 409 C1 | 7/2000 |
| EP | 0 365 689 | 5/1990 |

(List continued on next page.)

OTHER PUBLICATIONS

Dietmar Weinmann, "Applicatons of NdFeB-magnets in motors," Apr. 1991, pp. 45-51.

*Primary Examiner*—Thanh Lam
(74) *Attorney, Agent, or Firm*—Oliff & Berridge, PLC

(57) ABSTRACT

The present invention relates to a drive element such as a driving wheel for a goods-handling cart or the like, or such as a hoisting winch, the drive element comprising a wheel or a drum and an electric motor for rotating the wheel or the drum. The electric motor is a synchronous motor having a permanent-magnet rotor and a stator comprising teeth and respective individual windings on said teeth.

30 Claims, 1 Drawing Sheet

FOREIGN PATENT DOCUMENTS

| | | |
|---|---|---|
| EP | 0 438 594 A1 | 7/1991 |
| EP | 0 464 929 A2 | 1/1992 |
| EP | 0 669 699 A1 | 8/1995 |
| EP | 0 777 312 A2 | 6/1997 |
| EP | 0 866 540 A2 | 9/1998 |
| EP | 0 909 009 A1 | 9/1998 |
| EP | 0 872 943 A1 | 10/1998 |
| EP | 0 877 540 A1 | 11/1998 |
| EP | 0 999 081 A2 | 5/2000 |
| EP | 1 001 507 A1 | 5/2000 |
| EP | 1 010 660 A1 | 6/2000 |
| EP | 1 050 948 A2 | 11/2000 |
| FR | 2 784 815 | 4/2000 |
| GB | 258981 | 10/1926 |
| JP | 02097262 A | 4/1990 |
| JP | 7-107707 | 4/1995 |
| JP | 7 264822 | 10/1995 |
| JP | 9-322455 | 12/1997 |
| JP | 10-126990 | 5/1998 |
| JP | 10-146030 | 5/1998 |
| JP | 2000-152537 | 5/2000 |
| JP | 2000-333407 | 11/2000 |

\* cited by examiner

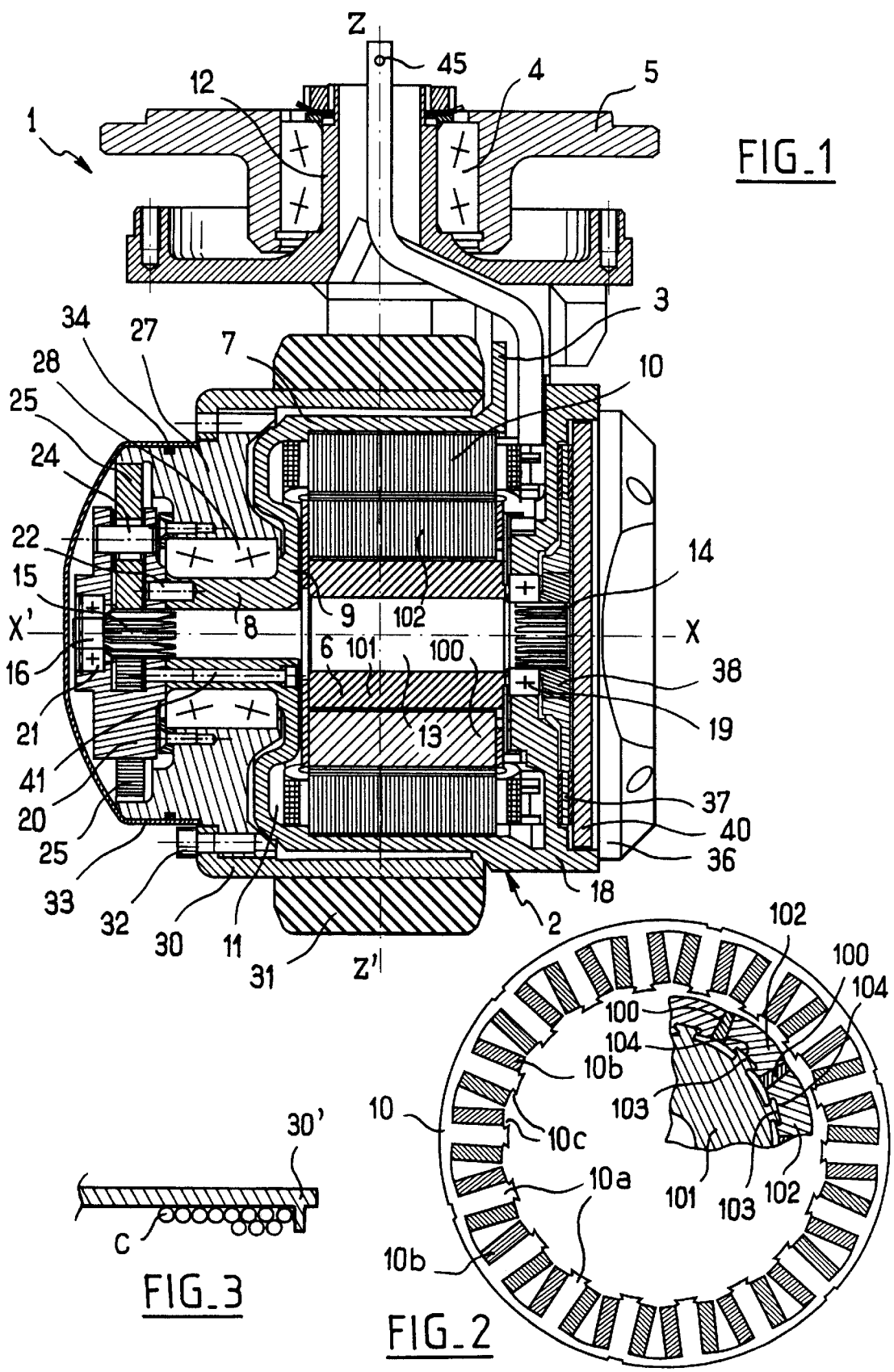

DRIVE ELEMENT SUCH AS A DRIVING WHEEL OR A HOISTING WINCH, THE ELEMENT COMPRISING A SYNCHRONOUS MOTOR

The present invention relates to a drive element such as a driving wheel for goods-handling carts, in particular pallet trucks or the like, or such as a hoisting winch.

BACKGROUND OF THE INVENTION

Of the various ways in which goods-handling carts can be motor-driven, the most widespread makes use of a driving wheel.

In most cases, the driving wheel can also be steered, being mounted to swivel about a vertical axis.

The swivel diameter of the wheel must be as small as possible, in particular when the driving wheel is not central, so as to maximize the distance between the wheels of the cart and increase its stability.

Cart manufactures often require the swivel diameter to be the same as the diameter of the wheel's tire.

In known driving wheels, the wheel is rotated via a stepdown gear box by an electric motor of the direct current (DC) type or of the asynchronous type, which means that the volume occupied by the motor must be located above the wheel if the requirements of cart builders are to be satisfied.

This gives rise to a large amount of space being occupied in the vertical direction and to a structure that is relatively complex.

A similar space-occupancy problem arises for hoisting winches where the motor drives a drum.

European patent application No. EP-A-1 001 507 discloses an electrical machine for installing in a wheel of a private vehicle, the machine having a flux-concentrating rotor with permanent magnets.

OBJECTS AND SUMMARY OF THE INVENTION

An object of the present invention is to propose a novel drive element such as a driving wheel or a hoisting winch having a configuration that is compact and a structure that is relatively simple.

In this novel drive element the electric motor for driving the wheel or the drum is a synchronous motor having permanent magnets and a stator wound on teeth.

The term "stator wound on teeth" is used to mean a stator in which each tooth carries its own individual winding, unlike stators where windings are interleaved and which present the drawback of greater axial size because of the relatively great length of the winding ends, due to the way in which the winding is performed. Furthermore, the number of teeth $n_{teeth}$ is preferably a function of the number of pairs of poles $n_{pairs}$ and of the number of phases $n_{phases}$ in application of the formula $n_{teeth}=n_{pairs} \times n_{phases}$.

The rotor is preferably a flux-concentrating rotor, i.e. the magnets are placed between pole pieces. Combining a flux-concentrating rotor with a stator wound on teeth makes it possible to have a machine that is relatively powerful while also being compact, thus making it possible in particular to mount the motor so that it is cantilevered-out on the end of a shaft, thereby reducing the number of ball bearings. The rotor can rotate at high speed since the magnets are protected from the pulsating flux by the pole pieces. There is therefore no need to use fragmented magnets at high speeds, as is the case with rotors whose magnets are mounted on the surface.

Advantageously, the magnets of the rotor are wedge-shaped when the machine is observed along the axis of rotation of the rotor, of width that tapers going away from the axis of rotation of the rotor, and the pole pieces present cutouts and are engaged by means of those cutouts on ribs of the shaft. They are thus fixed to the rotor shaft by means of complementary shapes. Co-operation between the wedge-shaped magnets and the pole pieces connected to the shaft by means of complementary shapes is particularly advantageous in that, at high speeds, the magnets can exert compression forces on the pole pieces tending to oppose splaying out of those regions of the pole pieces that are situated on either side of the ribs on which they are engaged. This makes it possible to avoid the need to engage the pole pieces on bars, unlike the structure described in U.S. Pat. No. 5,091,668.

In addition, the fact of placing magnets between pole pieces enables the magnet to be protected from the currents that are induced at high speeds of rotation, and thus to avoid the magnets becoming heated which could demagnetize them.

In the invention, the motor whose axial size is small can be placed inside a wheel, a drum, or a pulley, with the axis of the rotor preferably coinciding with the axis of rotation of the wheel, drum, or pulley. For a driving wheel, the motor no longer needs to be offset upwards and the vertical size of the driving wheel is small, thereby making additional space available to cart builders above the wheel.

The invention also makes it possible to simplify the structure of any gearing that might be used, which gearing can comprise a single stepdown stage, and be constituted by an epicyclic gear train, for example.

The stepdown ratio can be less 15, e.g. lying in the range 7 to 12, by using a permanent magnet rotor and a stator wound on teeth, making it possible to work both in attraction and in repulsion, and thus to generate greater torque than can be generated by a reluctance motor which works in attraction only.

The teeth of the stator can advantageously receive individual coils presenting heads that are very short, thus enabling axial size to be small. The teeth of the stator then preferably lack any pole spreading, thus making it easier to install the coils on the teeth, and also to remove them should that be necessary in order to replace them.

The use of a stator wound on teeth is also advantageous in that it makes it possible for the motor to be implemented with a relatively small number of teeth and coils, and thus at a cost which is advantageous. The mass of the magnets used can also be relatively low, thus reducing materials costs.

In a particular embodiment, the drive element comprises a main casing having a tubular wall of large diameter, a tubular wall of small diameter on the same axis as the preceding wall, and a transverse wall interconnecting said tubular walls. The stator is housed in the large-diameter tubular wall which is secured to a first bearing-forming piece. The small-diameter tubular wall is secured to a second bearing-forming piece. The large and small-diameter tubular walls and the transverse wall are preferably made as a single piece. In a variant, the large-diameter tubular wall can be constituted by a fitted piece, with the small-diameter tubular wall and the transverse wall being made as a single piece.

In a particular embodiment, the second bearing-forming piece also constitutes a planet-carrier having at least one shaft on which there rotates at least one planet wheel, and preferably three planet wheels, each planet wheel meshing both with a gear made in or fitted to the shaft of the rotor and with a ring gear of a support. This ring can be fitted to the support or it can be made integrally therewith. For a driving wheel, a rim supporting the tire of the wheel can be fixed to said support.

In a particular embodiment, the drive element includes a bearing enabling the support to turn on the small-diameter tubular wall of the main casing.

Still in a particular embodiment, the drive element includes a cap fitted in sealed manner onto the support. The cap may serve to contain grease or oil for lubricating the gearing.

For a driving wheel or a winch, the drive element preferably includes an electromagnetic brake that operates on power failure and that is fitted to the first bearing-forming piece, said brake comprising a disk fixed on a fluted end of the rotor shaft. The main casing can be swivel-mounted, or in a variant it can be fixed directly to the chassis when the drive element is a driving wheel that does not need to be steerable.

As mentioned above, the invention enables the rotor to be coaxial with the tire of the wheel or with the drum, thereby reducing the space occupied in a vertical direction by the drive element since there is no need for the motor to be offset.

The invention also provides a cart fitted with at least one driving wheel as defined above, which wheel can optionally be steerable.

BRIEF DESCRIPTION OF THE DRAWING

The invention will be better understood on reading the following detailed description and on examining the accompanying drawing, in which:

FIG. 1 is a diagrammatic vertical axial section view of a driving wheel constituting a non-limiting embodiment of the invention;

FIG. 2 is a diagrammatic cross-section view showing the stator wound on teeth in isolation, together with a fragment of the rotor;

FIG. 3 is a partial diagrammatic view of a hoisting winch.

DETAILED DESCRIPTION OF THE PREFERRED EMBODIMENTS

FIG. 1 shows a driving wheel constituting an embodiment of the invention.

This driving wheel 1 comprises an electric motor 2 which, in accordance with the invention, is of the synchronous type, comprising a flux-concentrating permanent magnet rotor 6 and a stator 10 wound on teeth, the stator being shown in FIG. 2.

Each tooth 10a carries an individual coil 10b belonging thereto. The stator 10 in the example described has eighteen teeth, while the rotor has twelve poles and the power supply is three-phase.

Each tooth 10a is deprived from pole shoes, as one can see on FIG. 2. Each tooth may comprise notches for the mounting of a wedge, not shown, to maintain the individual coils onto the teeth.

The rotor 6 has transversely-magnetized permanent magnets 100 disposed between pole pieces 102, each constituted by a stack of magnetic laminations that are identical in shape and superposed on one another.

When seen looking along the axis of rotation of the rotor, each magnet 10 is generally wedge-shaped, of substantially trapezoidal cross-section that tapers going towards the stator. The magnets 100 are placed radially between the pole pieces 102. The pole pieces are not interconnected magnetically, being fixed on a non-magnetic shaft 101 by means of complementary shapes. For this purpose, the shaft has axial ribs 103 and the pole pieces have cutouts 104 of complementary shapes. The wedge-shape of the magnets 100 enables them to be held effectively and simply on the rotor. The fixing of the pole pieces onto the shaft by means of complementary shapes enables the connection between the shaft and the pole pieces to be made in such a manner as to make it possible to manufacture the shaft out of a material that is non-magnetic, such as aluminum. Other materials can be used, such as an aluminum alloy or a non-magnetic casting.

Each individual coil 10b is constituted by winding electric wires around a winding axis, which wires can be rectangular in cross-section, having their long sides parallel to the winding axis. In a variant, circular section wires could be used.

The coils 10b are excited so as to produce a rotating field in order to drive the rotor.

The driving wheel comprises a main casing 3 which can be swivel-mounted on an element 5 secured to the chassis of the cart by means of a hollow shaft 12 and a ball bearing 4 suitable for pivoting about a vertical axis Z–Z'.

In a variant that is not shown, the main casing 3 is fixed in non-swivel manner to the vehicle chassis, and the wheel is not used for steering.

The main casing 3 has a large-diameter tubular wall 7 and a small-diameter tubular wall 8 interconnected by a transverse wall 9.

In the example shown, these three walls are made as a single piece, but in a variant they could be made differently.

The motor stator 10 is received inside the large-diameter tubular wall 7, the transverse wall 9 presenting an annular groove 11 for receiving the projecting portions of the stator windings.

The rotor shaft 13 has an end 14 that is fluted and an end 15 that is provided both with a gearwheel cut into it and with a circularly cylindrical stub axle 16. In a variant, the gear could be fitted onto the shaft.

The large-diameter tubular wall 7 is fixed to a bearing-forming endpiece or cheekplate 18 which supports a ball bearing 19 within which the fluted end portion 14 rotates.

The small-diameter tubular wall 8 of the main casing 3 is fixed to the planet-carrier 20 by means of screws 41 and is coupled to the planet-carrier 20 by any suitable means, e.g. pins 22. In a variant, the coupling between the tubular wall 8 and the planet-carrier 20 can be achieved by means of complementary shapes, by making teeth at the end of the tubular wall and a housing of complementary shape in the planet-carrier.

The planet-carrier 20 carries a ball bearing 41 within which the stub axle 16 of the rotor rotates.

The planet-carrier supports pins 24 parallel to the axis of rotation X–X' of the rotor, and each of these pins carries a planet wheel 25.

In the example described, the gearing has three planet wheels 25 which mesh firstly with the gear 15 cut into the shaft 13 of the rotor, and secondly with a ring 27a belonging to a support 27. In a variant, the ring 27a could be constituted by a fitted element.

A ball bearing 28 is placed between the small-diameter tubular wall 8 and the support 27 to enable the support to rotate about the axis X–X'.

A rim 30 supporting a tire 31 is fixed to the support 27 by means of screws 32.

A cap 33 is fixed in sealed manner to the support 27.

In the embodiment described, the support 27 has a circularly cylindrical surface at its periphery with an annular groove formed therein to receive an O-ring 34, against which the cap 33 bears. Sealing could be obtained in some other way.

At its side opposite from the epicyclic gear train, as described above, the wheel 1 has a brake 36 that is fixed to the bearing-serving piece 18 and that acts in the event of a power failure.

The brake comprises a disk 37 provided with a fluted hub 38 which engages on the fluted end 40 of the rotor, and also provided with brake linings, in conventional manner.

The brake also comprises moving equipment 40 suitable for pressing against the disk 37 when no power is applied to the motor.

Cables 45 for powering and controlling the electric motor extend through the hollow shaft 12 that is swivel-mounted to the chassis. In a variant, these cables could be disposed otherwise.

The above-described driving wheel 1 occupies an axial space that is smaller than the outside diameter of a new tire, or that is close thereto, thus making it possible to satisfy the requirements of cart manufacturers.

The motor is housed inside the wheel, without being offset above the tire, thus making additional space available in the cart.

Naturally, the invention is not limited to the embodiment described above.

In particular, as mentioned above, the main casing need not be swivel-mounted to the chassis of the cart.

It is also possible to omit the stepdown gearing, in which case the motor would drive the wheel directly.

It is also possible to omit the brake, it being possible to perform braking in some other way, e.g. using the motor.

Naturally the gearing could be modified and in particular it is possible to use some other number of planet wheels.

The invention also applies to a hoisting winch, in which case the motor drives a winch or a pulley.

For a hoisting winch, the rim 30 and tire 31 are replaced by a winch 30' as shown in FIG. 3, on which a cable C can be wound. The main casing 3 can be modified to be not swivel-mounted.

What is claimed is:

1. A driving wheel element, comprising:
    a wheel; and
    an electric motor for rotating the wheel, wherein the electric motor is a synchronous motor having a stator comprising teeth deprived of pole shoes and respective individual windings on said teeth and a permanent-magnet flux-concentrating rotor comprising pole pieces and magnets disposed radially between the pole pieces.
2. A driving wheel according to claim 1, wherein the wheel is coupled to the motor via stepdown gearing.
3. A driving wheel according to claim 2, wherein the gearing comprises a single stepdown stage.
4. A driving wheel according to claim 3, wherein the gearing comprises an epicyclic gear train.
5. A driving wheel according to claim 3, wherein the single stepdown stage has a stepdown ratio no greater than 15.
6. A driving wheel according to claim 5, wherein the stepdown ratio is in the range between 7 and 2.
7. A driving wheel according to claim 1, including a main casing comprising a large-diameter tubular wall and a small-diameter tubular wall interconnected by a transverse wall, the stator being received in the large diameter wall, which wall is secured to a first bearing-forming piece, the small-diameter tubular wall being secured to a second bearing-forming piece.
8. A driving wheel according to claim 7, wherein the second bearing-forming piece also constitutes a planet-carrier and has at least one pin rotatably carrying at least one planet wheel.
9. A driving wheel according to claim 8, wherein said planet-carrier carries three planet wheels, each planet wheel meshing with a gear cut in or fitted to the rotor shaft, and also with a ring gear of a support.
10. A driving wheel according to claim 8, wherein a rim supporting a tire is fixed to the support.
11. A driving wheel according to claim 10, wherein the support rotates via a bearing on the small-diameter tubular wall of the main casing.
12. A driving wheel according to claim 8, including a cap fitted in leaktight manner to the support.
13. A driving wheel element according to claim 7, including an electromagnetic brake that operates in the event of a power failure, the brake being fitted to said first bearing-forming piece, and comprising a disk fixed to a fluted end of the motor shaft.
14. A driving wheel according to claim 7, wherein the main casing is mounted to swivel about a vertical axis.
15. A driving wheel according to claim 7, wherein the motor drives a wheel and wherein the main casing is fixed in non-swivel manner to the chassis of the cart.
16. A driving wheel according to claim 1, wherein the rotor is coaxial with the tire of the wheel.
17. A hoisting winch, comprising:
    a winch; and
    an electric motor for rotating the winch, wherein the electric motor is a synchronous motor having a permanent-magnet rotor and a stator comprising teeth deprived of pole shoes and respective individual windings on said teeth.
18. A hoisting winch according to claim 17, wherein the rotor is a flux-concentrating rotor and has magnets disposed between pole pieces.
19. A hoisting winch according to claim 17, wherein the winch is coupled to the motor via stepdown gearing.
20. A hoisting winch according to claim 19, wherein the gearing comprises a single stepdown stage.
21. A hoisting winch according to claim 20, wherein the gearing comprises an epicyclic gear train.
22. A hoisting winch according to claim 20, wherein the single stepdown stage has a stepdown ratio no greater than 15.
23. A hoisting winch according to claim 22, wherein the stepdown ratio is in the range between 7 and 2.
24. A hoisting winch according to claim 17, including a main casing comprising a large-diameter tubular wall and a small-diameter tubular wall interconnected by a transverse wall, the stator being received in the large diameter wall, which wall is secured to a first bearing-forming piece, the small-diameter tubular wall being secured to a second bearing-forming piece.
25. A hoisting winch according to claim 24, wherein the second bearing-forming piece also constitutes a planet-carrier and has at least one pin rotatably carrying at least one planet winch.

26. A hoisting winch according to claim 25, wherein said planet-carrier carries three planet wheels, each planet wheel meshing with a gear cut in or fitted to the rotor shaft, and also with a ring gear of a support.

27. A hoisting winch according to claim 26, wherein the support rotates via a bearing on the small-diameter tubular wall of the main casing.

28. A hoisting winch according to claim 25, including a cap fitted in leaktight manner to the support.

29. A hoisting winch according to claim 24, including an electromagnetic brake that operates in the event of a power failure, the brake being fitted to said first bearing-forming teeth, and comprising a disk fixed to a fluted end of the motor shaft.

30. A driving wheel element, comprising:
   a wheel;
   a synchronous electric motor for rotating the wheel, said electric motor comprising:
      a stator comprising teeth deprived of pole shoes and respective individual windings on said teeth; and
      a permanent magnet rotor;
   a stepdown gearing coupling the motor to the wheel, said stepdown gearing comprising:
      an epicyclic gear train comprising:
         a planet carrier, said planet carrier being in a fixed position relative to the stator;
         at least one planet wheel rotating on the planet carrier; and
         a ring being in a fixed position relative to the wheel, said at least one planet wheel intermeshing with the rotor and the ring to transmit rotation of the rotor to the wheel.

* * * * *